(12) United States Patent
Fencel et al.

(10) Patent No.: US 6,574,904 B1
(45) Date of Patent: Jun. 10, 2003

(54) WIND ACTIVATED DECOY

(76) Inventors: Jeffery J. Fencel, 13 Northwood Dr., Bethalto, IL (US) 62010; Matthew J. Baalman, P.O. Box 85A, Hardin, IL (US) 62047

( * ) Notice: Subject to any disclaimer, the term of this patent is extended or adjusted under 35 U.S.C. 154(b) by 0 days.

(21) Appl. No.: 10/001,989

(22) Filed: Dec. 5, 2001

(51) Int. Cl.[7] .............................................. A01M 31/06
(52) U.S. Cl. .......................................................... 43/3
(58) Field of Search ........................ 43/3, 2; 446/217, 446/243, 244, 199; 40/412, 417; 73/170.01, 170.05

(56) References Cited

U.S. PATENT DOCUMENTS

| | | | | |
|---|---|---|---|---|
| 507,381 A | * | 10/1893 | Newton | 40/412 |
| 547,553 A | | 10/1895 | Keller | 43/3 |
| 2,441,753 A | | 5/1948 | Carpenter | 43/3 |
| 2,545,801 A | * | 3/1951 | Wrazen | 40/412 |
| 2,638,705 A | | 5/1953 | Petrasy | 446/199 |
| 3,707,798 A | | 1/1973 | Tryon | 43/3 |
| 4,432,158 A | * | 2/1984 | Nicholas | 446/325 |
| 4,620,385 A | | 11/1986 | Carranza et al. | 43/3 |
| 4,651,457 A | | 3/1987 | Nelson et al. | 43/3 |
| 4,656,768 A | | 4/1987 | Thigpen | 40/412 |
| 5,003,722 A | | 4/1991 | Berkley et al. | 43/3 |
| 5,085,075 A | * | 2/1992 | Baker | 73/170.05 |
| 5,144,764 A | | 9/1992 | Peterson | 43/3 |
| 5,283,088 A | | 2/1994 | Alcorn | 446/199 |
| 5,682,702 A | | 11/1997 | McKnight et al. | 43/3 |
| 5,862,619 A | | 1/1999 | Stancil | 43/3 |
| 6,092,323 A | | 7/2000 | McBride et al. | 43/3 |
| 6,170,188 B1 | | 1/2001 | Mathews | 43/3 |
| 6,216,382 B1 | * | 4/2001 | Lindaman | 43/2 |
| 6,250,565 B1 | * | 6/2001 | Ogie et al. | 40/412 |
| 6,339,894 B1 | * | 1/2002 | Solomon | 43/3 |
| 6,360,474 B1 | * | 3/2002 | Wurlitzer | 43/3 |
| 6,408,559 B2 | * | 6/2002 | Mathews | 43/3 |
| 6,449,894 B1 | * | 9/2002 | Price et al. | 43/3 |
| 6,484,431 B2 | * | 11/2002 | Price et al. | 43/3 |
| 6,493,980 B1 | * | 12/2002 | Richardson et al. | 43/3 |
| 6,508,028 B1 | * | 1/2003 | Crowe | 43/3 |

FOREIGN PATENT DOCUMENTS

| | | |
|---|---|---|
| CA | 1050268 | 3/1979 |
| CA | 2052585 | 4/1992 |
| CA | 2177498 | 11/1997 |

* cited by examiner

*Primary Examiner*—Darren W. Ark
(74) *Attorney, Agent, or Firm*—Richard C. Litman

(57) ABSTRACT

A wind activated decoy has a silhouette body with a wing support therethrough. Opposite first and second wings are secured to respective wing spars, with one spar being removably installable through the support. The second wing attaches removably to the first spar after installation through the support. Each wing comprises a thin, rigid sheet with a sinusoidal cross section to catch the wind and cause the panels to rotate. The chords of the two panels have an angular displacement of forty five degrees, to avoid any singularity and provide continuously unequal aerodynamic forces upon the panels to produce continuous rotation in a breeze. The panels are marked differently on opposite surfaces and when rotated, simulate the flashing of a bird's wings when the bird is alighting. A support column extends from the body and is removably installable in a tubular support, allowing the decoy to pivot freely into the wind.

13 Claims, 5 Drawing Sheets

WIND ACTIVATED DECOY

BACKGROUND OF THE INVENTION

1. Field of the Invention

The present invention relates generally to the sport of wildfowl hunting, and more specifically to a decoy having wind activated vanes or simulated wings. The wings are supported by low friction bearings which enable them to turn in extremely light breezes to simulate the appearance of the wing motion of a waterfowl (duck, goose, etc.) alighting on a body of water. The decoy is further supported by a generally vertical post, which allows the decoy to swivel into the prevailing wind in order to provide greater realism and proper airflow over the wings.

2. Description of the Related Art

Decoys, lures and the like have been used by hunters to attract game from the beginnings of the activity. Hunters have recognized that relatively crude decoys and the like are not particularly effective, but have employed such crude decoys as being better than nothing. More recently, relatively sophisticated decoys using audioanimatronic principles have been developed, with such decoys serving to attract and fool game animals to a much greater extent than earlier, relatively simple decoys and lures.

However, such relatively sophisticated decoys, with their electrically operated components, tend to be relatively fragile, particularly in the outdoor environment where they are subject to temperature extremes, moisture, etc. Such complex decoys are also relatively expensive to purchase initially, as well as to maintain. As a result, they have never found great favor among hunters and others who wish to use decoys to attract game animals.

Nonetheless, the provision of a decoy which employs some periodic movement, is desirable. Most animals are attuned to detect movement before detecting most other visual cues (color, contrast, etc.). While some aspects of movement may startle the game animals away, a movement which is relatively natural in its appearance is desirable, particularly if the movement can be achieved without complex and costly electromechanical mechanisms.

Accordingly, a need will be seen for a decoy employing simulated wings deployed laterally from the body of the device. The simulated wings extend laterally on rotary shafts or spars, which are in turn mounted through the decoy body on roller or ball bearings to provide an extremely low friction attachment. The slightest breeze causes the two wings and their rotationally mounted spars to rotate in their bearings through the body, with the result having an appearance from some distance away much like the wing beat of a bird alighting. The body of the decoy is mounted in a similar manner upon a generally vertical post, which allows the decoy to pivot to face into the wind in a realistic manner while also providing more efficient airflow to the wings.

A discussion of the related art of which the present inventors are aware, and its differences and distinctions from the present invention, is provided below.

U.S. Pat. No. 547,553 issued on Oct. 8, 1895 to Arthur H. Keller, titled "Toy," describes a simulated bird having a wing flapping mechanism powered by a ratchet mechanism, which is in turn powered by a cord as it is unwound from a wheel within the device. The toy bird is mounted on a line which extends at an angle downwardly between two points, with the weight of the toy causing the first line to unwind to cause the wing mechanism to flap. The Keller device is not powered by the wind, and cannot operate when the body of the device is at rest upon a level surface.

U.S. Pat. No. 2,441,753 issued on May 18, 1948 to Gurdeon E. Carpenter, titled "Duck Decoy," describes a silhouette or profile type decoy formed of a single relatively thin sheet of plywood or other suitable material. The decoy shape and markings generally present the appearance of a bird viewed from above, with wings outspread. The entire apparatus is pivotally balanced upon a stake which is in turn driven into the underlying surface to support the decoy and allow it to pivot into the wind. Movement of the decoy about its pivot simulates a gliding bird with outspread wings. However, the Carpenter decoy is a single monolithic unit with no relatively movable wings, whereas the present decoy with its wind activated rotary vanes serves to simulate the wing beat of an alighting bird, which cannot be accomplished with the fixed wings of the Carpenter decoy.

U.S. Pat. No. 2,638,705 issued on May 19, 1953 to Albert W. Petrasy, titled "Ornamental Bird Having Rotatable Wings," describes a simulated bird having a profile body with a short wing support shaft rotatably installed laterally through the body. A wing attachment arm is affixed to each end of the lateral shaft, with a wing panel extending from each attachment arm. The wing panels are each twisted, so as to provide a pitch angle or angle of attack when presented to the wind. The resulting apparatus is related to a propeller, but with the blade attachments being longitudinally offset from one another on the propeller shaft, rather than being in the same plane. The apparatus thus does not resemble the present decoy with its rotary wing panels having their elongate axes disposed along a single lateral axis.

U.S. Pat. No. 3,707,798 issued on Jan. 2, 1973 to Ned A. Tryon, titled "Decoy," describes a decoy formed of a pair of flat elements assembled in a cruciform configuration. The vertically disposed element resembles a silhouette of a goose body, while the horizontally disposed element represents the width of the body when viewed from above. The assembly is mounted atop a stake which is driven into the underlying surface to support the decoy. No relatively movable components are provided by Tryon for his decoy. No movable wing panels or pivoted mounting are provided by Tryon, in contrast to the pivoted mounting and rotating wing panels of the present wind activated decoy.

U.S. Pat. No. 4,620,385 issued on Nov. 4, 1986 to Thomas G. Carranza et al., titled "Rotatable Wings For Water Fowl Decoys," describes a simulated wing assembly in which each wing comprises four rotary vanes extending from a common lateral shaft. The shaft is immovably affixed to the mounting harness, with the wing vane assemblies extending from tubes which in turn rotate independently relative to one another upon the shaft. In contrast, the present wind activated decoy attaches the wings to a single common shaft, with the shaft rotating within low friction bearings disposed within a lateral passage through the decoy silhouette. A major advantage of the present decoy in comparison to the Carranza et al. decoy, is that the opposite wings of the present decoy have a fixed relationship with their planes disposed at a fixed angle of forty five degrees from one another. This relationship assures that the wings will always have a synchronous relationship, just as the wings of a real waterfowl would likely have as the bird flapped its wings while alighting, and also precludes any singularity where air pressure on the wings equalizes to preclude rotation. The planform of the wings of the present decoy is also more realistic than the rectangular planform of the wings of the Carranza et al. decoy. Moreover, the Carranza et al. decoy requires a relatively thick body in order to support the wing attachment harness or frame, thus adding to the cost of the apparatus. The present wind activated decoy utilizes a silhouette or profile body, which greatly reduces the cost of the decoy while reducing realism only slightly when viewed from an oblique angle at some distance away.

U.S. Pat. No. 4,651,457 issued on Mar. 24, 1987 to Robert D. Nelson et al., titled "Decoy," describes a silhouette head and neck portion with a pneumatically inflatable body portion extending therefrom. The head and neck portion is pivotally attached to a stake to allow the assembly to rotate in a breeze. However, the Nelson et al. decoy has no relatively movable wing panels to simulate the flight motion of a real bird, as does the present wind activated decoy. The Nelson et al. decoy only simulates a bird which is feeding, rather than one which is in flight and alighting on the surface, as in the case of the present wind activated decoy.

U.S. Pat. No. 4,656,768 issued on Apr. 14, 1987 to James C. Thigpen, titled "Wind Driven Sign," describes a character having a silhouette body with opposed wind driven arms each affixed to its own independent lateral shaft. The general configuration is more closely related to that of the decoy of the Petrasy '705 U.S. Patent, discussed further above, than to the present invention. No lateral vanes are provided by Thigpen to simulate horizontally spread wing panels, in contrast to the present wind activated decoy invention.

U.S. Pat. No. 5,003,722 issued on Apr. 2, 1991 to Robert D. Berkley et al., titled "Flying Game Bird Decoy," describes a decoy having a flat planform formed of thin sheets of foam plastic material mounted on a stake. The flexible sheet foam material allows the wing panels to move to simulate flight. However, no rotary motion is provided for the wing panels, nor is any realistic appearance provided from the side, due to the flat sheet elements.

U.S. Pat. No. 5,144,764 issued on Sep. 8, 1992 to Timothy D. Peterson, titled "Decoy With Wind-Actuated Wings," describes a decoy formed almost entirely of flexible materials. The body portion comprises a hollow fabric tube, serving as a wind sock. The wing panels are activated by the wind to flap in a breeze, simulating a flying bird. However, no rotary motion of the wing panels is provided by Peterson, in contrast to the present decoy. The wing panels of the Peterson decoy are formed of thin, flexible sheet elements with wire or other stiffening rods. The rods hold the wings outspread, while allowing them to flap upwardly and downwardly in a wind. The inflatable body portion and flexible wing elements of the Peterson decoy are unlike the present decoy.

U.S. Pat. No. 5,283,088 issued on Feb. 1, 1994 to Dorothy H. Alcorn, titled "Bird Figure," describes a simulated hummingbird having a profile body and laterally disposed rotating wings. Each wing panel is formed of a single, generally star-shaped element folded to provide a series of six wing panels extending radially from a lateral axis. Alcorn states that the wing panels rotate in a breeze, but she does not provide any aerodynamic curvature to generate any aerodynamic forces upon the panels. In contrast, the present wind activated decoy includes relatively easily fabricated rotary wings, each formed of a single panel having a sinusoidal cross sectional shape to generate aerodynamic forces for rotation. Moreover, Alcorn suspends her hummingbird model from a string, which is impracticable for a decoy used in the field.

U.S. Pat. No. 5,682,702 issued on Nov. 4, 1997 to Craig T. McKnight et al., titled "Collapsible Bird Decoy," describes a structure formed of a series of relatively thin, flat panels secured orthogonally together to provide an assembly having a somewhat three dimensional appearance. The wing panels are flexible in order to flap in a breeze, and the assembly is pivotally mounted atop a stake in order to align itself with the breeze. No rotary motion is provided for the wing panels. The resulting structure is thus more closely related to the decoys of the Berkley et al. '722 and Peterson '764 U.S. Patents, than to the present wind activated decoy invention.

U.S. Pat. No. 5,862,619 issued on Jan. 26, 1999 to Jeffrey T. Stancil, titled "Animated Water Fowl Decoy," describes a decoy having a three dimensional body with a frame disposed thereabove. A laterally disposed rotary wing shaft extends across the frame, with a single rotary wing installed on the shaft. The Stancil decoy is in some respects relatively more costly and complex than the present decoy, in that Stancil provides a three dimensional body for his decoy. Yet, the wing provided for the Stancil decoy is relatively primitive and unrealistic, with its frame mounted above the decoy body and single, laterally continuous span supported by each wing tip. In contrast, the present decoy wings provide considerably greater realism, with their individual spans extending to each side of the decoy body.

U.S. Pat. No. 6,092,323 issued on Jul. 25, 2000 to Craig M. McBride et al., titled "Duck Decoy," describes a decoy with a rotary wing assembly extending to each side thereof. The decoy body is three dimensional and is supported by a central stake, with the outboard ends of the wing panels supported by lateral extensions of the stake. The McBride et al. wing assembly is not a cantilever structure with unsupported outer tips, as is the present decoy wing with its more realistic cantilever structure. Moreover, McBride et al. do not provide any means for their decoy to pivot about the vertical axis of the mounting stake to allow their decoy to pivot into the wind, whereas the present decoy can pivot freely into the wind according to variation in the wind direction in order to orient the airflow properly to activate the wing action and for greater realism.

U.S. Pat. No. 6,170,188 issued on Jan. 9, 2001 to Robert F. Mathews, titled "Apparatus For Attracting Waterfowl," describes a decoy having a superficial resemblance to the present decoy. The Mathews decoy requires a three dimensional body, as the device contains a motor to provide power to the rotary wings. As Mathews prefers to provide power for wing rotation, he does not provide any means for his decoy to pivot into the wind, as is evidenced by its attachment to a series of square section tubes which cannot rotate relative to one another. Moreover, such motorized decoy mechanisms are not universally legal for hunting, whereas the present wind activated decoy mechanism is legal and is considerably less costly to purchase and maintain than such motorized decoy mechanisms.

Canadian Patent Publication No. 1,050,268 issued on Mar. 13, 1979 to Marvin Snow, titled "Water Fowl Decoy," describes a decoy having a folding and flapping wing mechanism which may be remotely actuated by lines or cords. The wings of the Snow decoy are rigid panels, pivotally hinged to each side of the decoy body. The wings do not rotate about a lateral or any other axis extending from the body, as do the rotating wings of the present decoy. Moreover, the wings of the Snow decoy must be actuated manually. They do not operate automatically due to airflow from a wind or breeze, as is the case with the present wind actuated decoy.

Canadian Patent Publication No. 2,052,585 published on Apr. 3, 1992 to Bruce R. Balmer, titled "Wing Attachment For Bird Decoys," describes a wing attachment formed of an extremely thin and lightweight flexible plastic sheet or other suitable material. Wire stays or spars may be installed with the sheets to spread the wings as desired. While the Balmer wings will tend to flutter in a breeze, they do not rotate or provide significant movement to simulate the flapping of a bird alighting upon a surface, as do the present wind activated decoy wings.

Finally, Canadian Patent Publication No. 2,177,498 published on Nov. 29, 1997 to Philippe Dupuis, titled "Hunting Decoy," describes a flat panel decoy closely resembling that of the '798 U.S. Patent to Tryon, discussed further above. As in the Tryon decoy, the Dupuis decoy does not provide any wing movement.

None of the above inventions and patents, either singly or in combination, is seen to describe the instant invention as claimed.

SUMMARY OF THE INVENTION

The present wind activated decoy essentially comprises a profile or silhouette decoy body with a lateral passage therethrough, for removably supporting a rotary shaft therein on bearings. The shaft includes a first permanently installed wing panel and a second removable wing panel, allowing the second panel to be removed from the shaft for removal of the shaft from the decoy body passage for compact storage of the components. Each wing panel comprises a thin, rigid sheet of material having a sinusoidal cross section in order to catch the wind and rotate or spin in a slight breeze. The two wing panels are secured upon the shaft with their chords at about a forty five degree angle to one another, in order to avoid any singularity where aerodynamic pressures are equalized and which would preclude rotation of the wing panels.

The present decoy includes a support shaft depending therefrom, which is removably inserted into a tube (pipe or conduit, etc.) which is in turn driven into the underlying surface (pond bottom, marsh, etc.). The support shaft is located somewhat forwardly of the lateral aerodynamic center of pressure of the decoy, thereby causing the decoy to pivot about the support shaft to face the prevailing breeze. This provides the proper orientation of the decoy for actuation of the rotary wing vanes, as well as producing greater realism to simulate real birds which face into the prevailing breeze or wind.

When a breeze is present, the rotary wing panels or vanes are rotated by the breeze. Preferably, the opposite surfaces of each panel are painted to resemble the upper and lower wing surfaces of a waterfowl (duck, goose, etc., depending upon the type of bird being simulated). As the wing panels rotate, they simulate the appearance of the rapid flapping of the wings of a bird alighting upon a surface. The present decoy thus provides a realistic appearance and action, while also being economical and easily deployed and removed in the field as desired.

Accordingly, it is a principal object of the invention to provide a wind activated decoy having a silhouette body with a rotary wing panel or vane extending to each side thereof.

It is another object of the invention to provide opposite first and second wing panels disposed upon a single common shaft or spar, with one of the panels being removable from the spar and the spar being removably installable in bearing supports within the silhouette body of the decoy.

It is a further object of the invention to provide a decoy in which the wing panels or vanes each comprise a thin, rigid sheet of material having a sinusoidal cross sectional shape to catch the wind to produce rotation of the panels in a breeze.

Still another object of the invention is to provide a wind activated decoy having the chords of the two rotary wing vanes angularly offset from one another, in order to avoid a singularity with equalized aerodynamic pressures which would preclude rotation at certain predetermined rotational angles.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
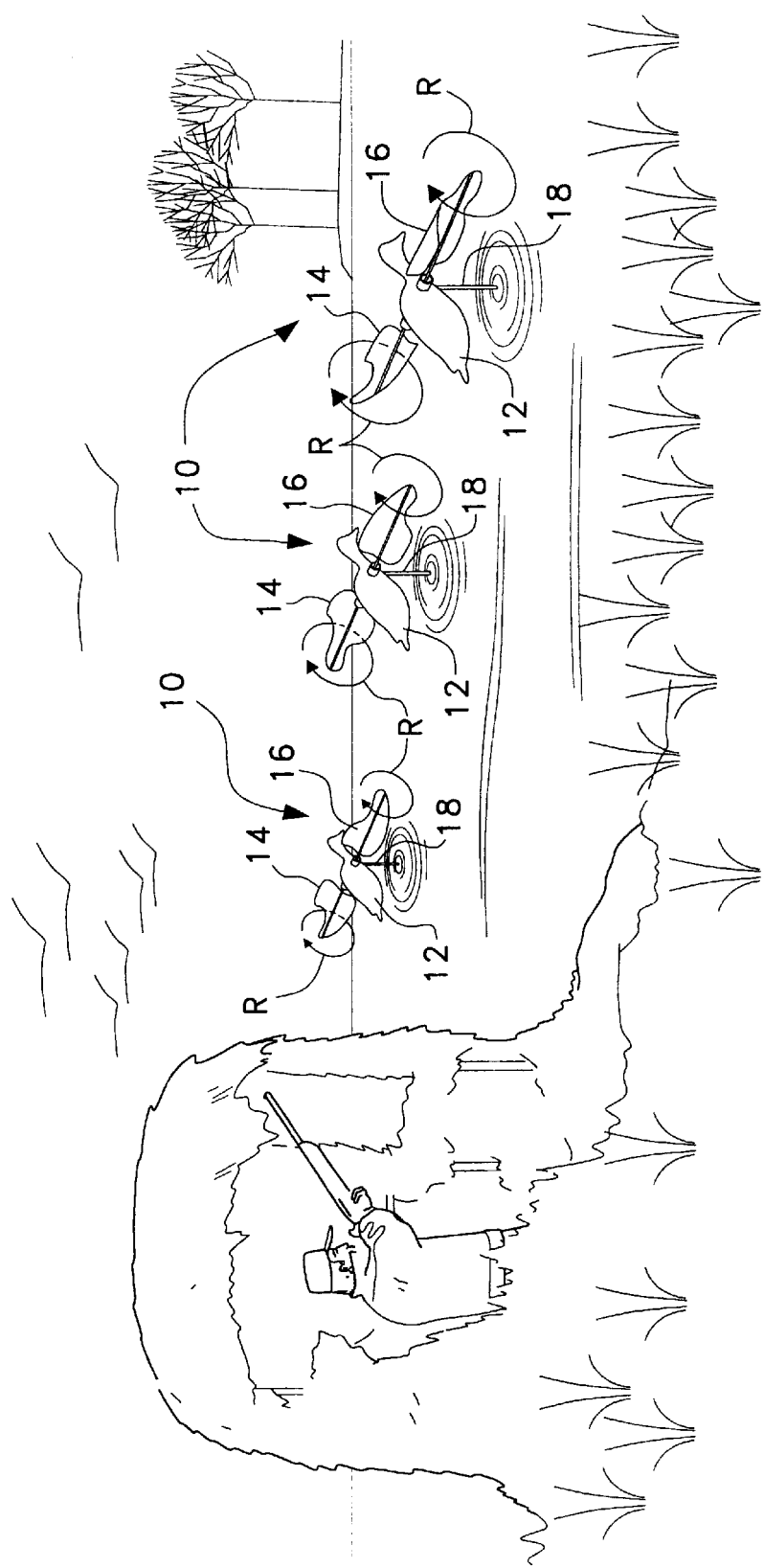
FIG. 1 is an environmental, perspective view of a series of the present wind activated decoys according to the present invention, deployed for attracting game birds.

The present invention is a decoy having wind activated rotary wings, simulating the appearance of the rapid flapping motion which occurs when a waterfowl or other bird is about to alight upon a surface. The present decoy utilizes relatively inexpensive and easily manufactured components, with the wing action being accomplished automatically in relatively light breezes. The relationship between the wing panels eliminates any singularity which might occur, assuring that the wings will rotate continually whenever sufficient breeze is present. The present wind activated decoy invention may be patterned to represent a mallard or other duck, as shown generally in the drawings, or may be configured to represent and attract other species of birds, e.g., geese, etc.

FIG. 1 provides an environmental view of a series of the present decoys 10 positioned to attract game birds or other waterfowl. Each of the decoys 10 comprises a profile or silhouette body 12 with a left and a right wing vane, respectively 14 and 16, extending laterally therefrom. The two wing vanes 14 and 16 are immovably affixed to one another when installed upon the decoy body 12, with their common central spar or shaft rotating within a central wing support tube which passes through the silhouette body 12. The wing panels 14 and 16 thus rotate in the same direction, as indicated by the rotational arrows R in FIGS. 1 and 2 of the drawings. Each decoy 10 is supported by a depending support shaft which installs removably within a support tube 18, to allow the decoys 10 to pivot automatically into the prevailing breeze.

Figure 2:
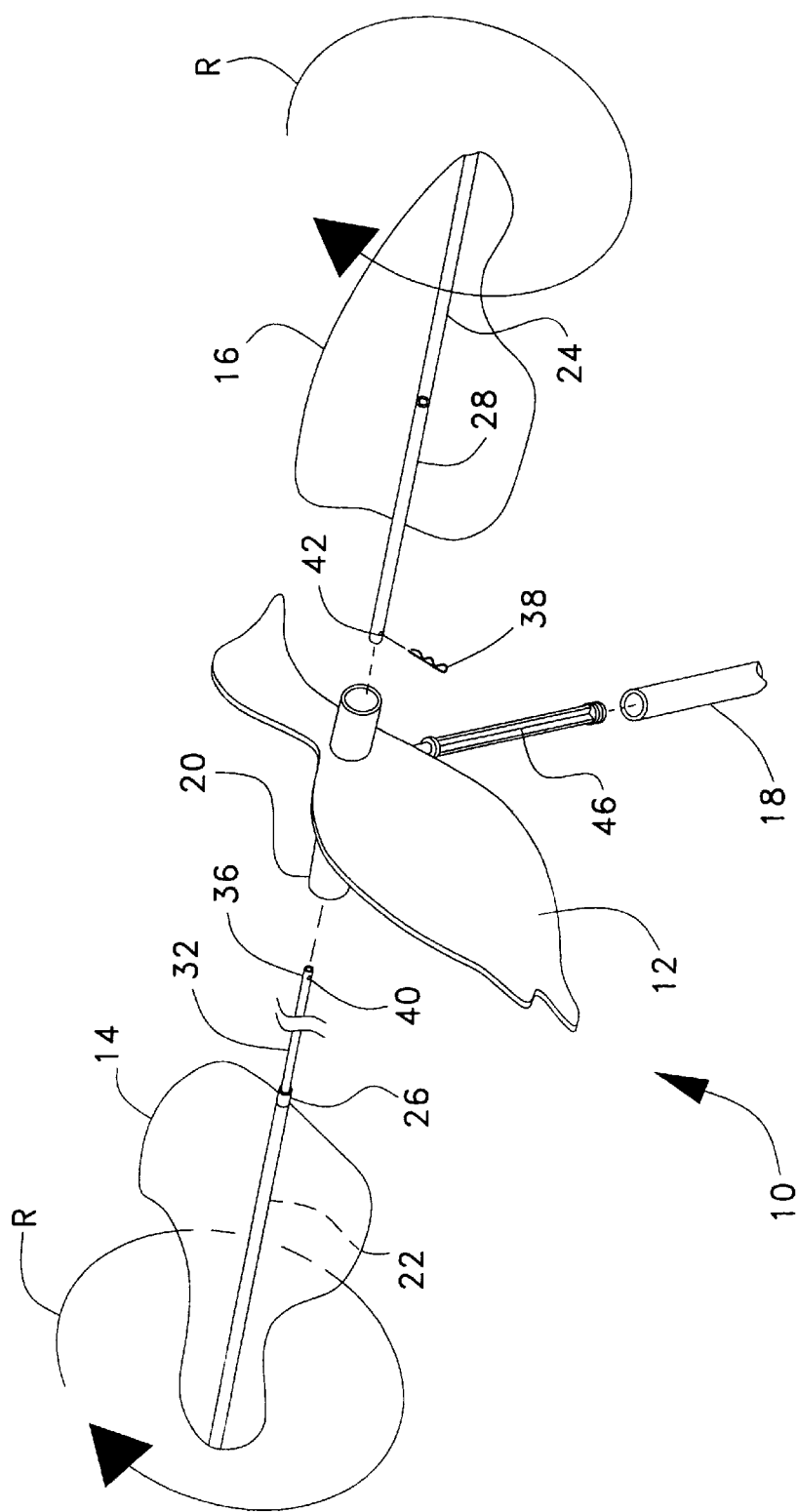
FIG. 2 is an exploded perspective view of the present wind activated decoy, showing the general relationship between components. FIG.

FIG. 2 illustrates the basic components of the present decoy 10, in further detail. The silhouette body portion 12 is formed of a relatively thin (i.e., one eighth inch thick, more or less) and rigid sheet of material, having an outline resembling that of a waterfowl (duck goose, etc.) or other game bird as desired. The body portion 12 may be made of any suitable material, but plastic is preferred for its relatively light weight, corrosion resistance, and economy. The body portion 12 may include additional stiffeners or reinforcement (not shown), with both the body portion 12 and the two wing vanes 14 and 16 preferably being colored or patterned to represent the game bird or waterfowl represented by the body 12 silhouette and the shape of the two wing vanes 14 and 16.

Each of the wing vanes or panels 14 and 16 is preferably formed of a thin, rigid sheet of material. Aluminum sheet has been found to work well, as it is resistant to corrosion when properly protected and is easily formed to have the desired aerodynamic shape for operation in relatively light breezes. Other materials (e.g., rigid plastic sheet, etc.) may be used as desired.

A wing support structure tube 20 passes laterally through the body portion 12, for supporting a wing spar rod which may be removably installed therein. The wing support tube 20 is preferably formed integrally with the silhouette or profile body portion 12, when the body 12 is cast or molded of a plastic material. Alternatively, the wing support structure tube 20 may be formed as a separate component and permanently installed with the decoy body 12, if so desired.

Each of the two wing vanes or panels 14 and 16 includes a generally semicylindrical channel, respectively 22 and 24, formed along the span thereof. The two wing channels 22 and 24 provide for securing first and second wing spar tubes, respectively 26 and 28, thereto. The two wing spar tubes 26 and 28 are permanently and immovably affixed within their respective wing vane channels 22 and 24, e.g. by blind rivets 30, as shown in FIG. 3, or by other suitable means (screws, bolts, adhesives, etc.) as desired.

Figure 3:
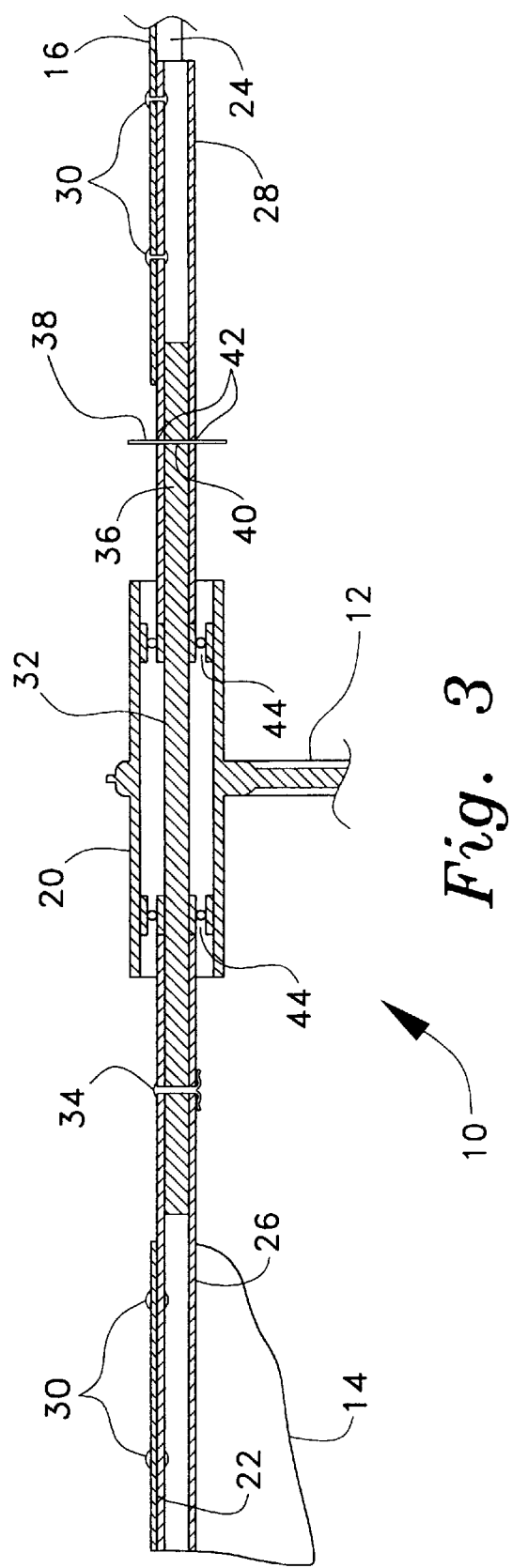
FIG. 3 is an elevation view in section of the rotary wing vane spar and support structure, showing details thereof.

The first wing spar tube 26 includes a solid wing spar rod 32 permanently and immovably affixed thereto, e.g., by a cotter pin 34 or the like as shown in FIG. 3, and extends concentrically from the tube 26. The spar rod 32 has a distal second wing spar tube attachment end 36, and serves as the central support for the two wing vanes 14 and 16. A portion of the spar rod 32 passes through the wing support structure tube 20 of the decoy body 12, and extends outwardly therefrom past the second side of the body 12 opposite the first wing panel 14. The second wing spar tube 28 installs concentrically over the distal second wing spar attachment tube end 36 of the spar rod 32, and is immovably secured thereto by a hitch pin 38 or the like which installs removably through corresponding holes 40 and 42 formed diametrically through the distal end of the wing spar rod 32 and root end of the second wing spar tube 28. Thus, the present decoy 10 is easily disassembled for compact storage by removing the hitch pin 38, removing the second wing spar tube 28 from the wing spar rod 32, and withdrawing the spar rod 32 from the wing support tube 20 of the decoy body 12.

The aerodynamic shapes of the two wing vane panels 14 and 16 capture the wind and produce rotation of the two panels 14 and 16 about the lateral axis defined by the wing spar rod 32 passing through the lateral wing support structure tube 20 of the decoy body 12. Ball bearings 44, shown in the cross section view of FIG. 3, or other suitable bearings (e.g. roller, needle, etc.), are preferably installed within the tube 20 in order to reduce friction to the greatest practicable degree and to allow rotation of the wing vane panels 14 and 16 in the slightest breezes. However, plain sleeve bearings may be used if so desired, although the greater friction of such plain bearings results in a need for greater wind velocity for rotation of the wing vanes 14 and 16.

Figure 4:
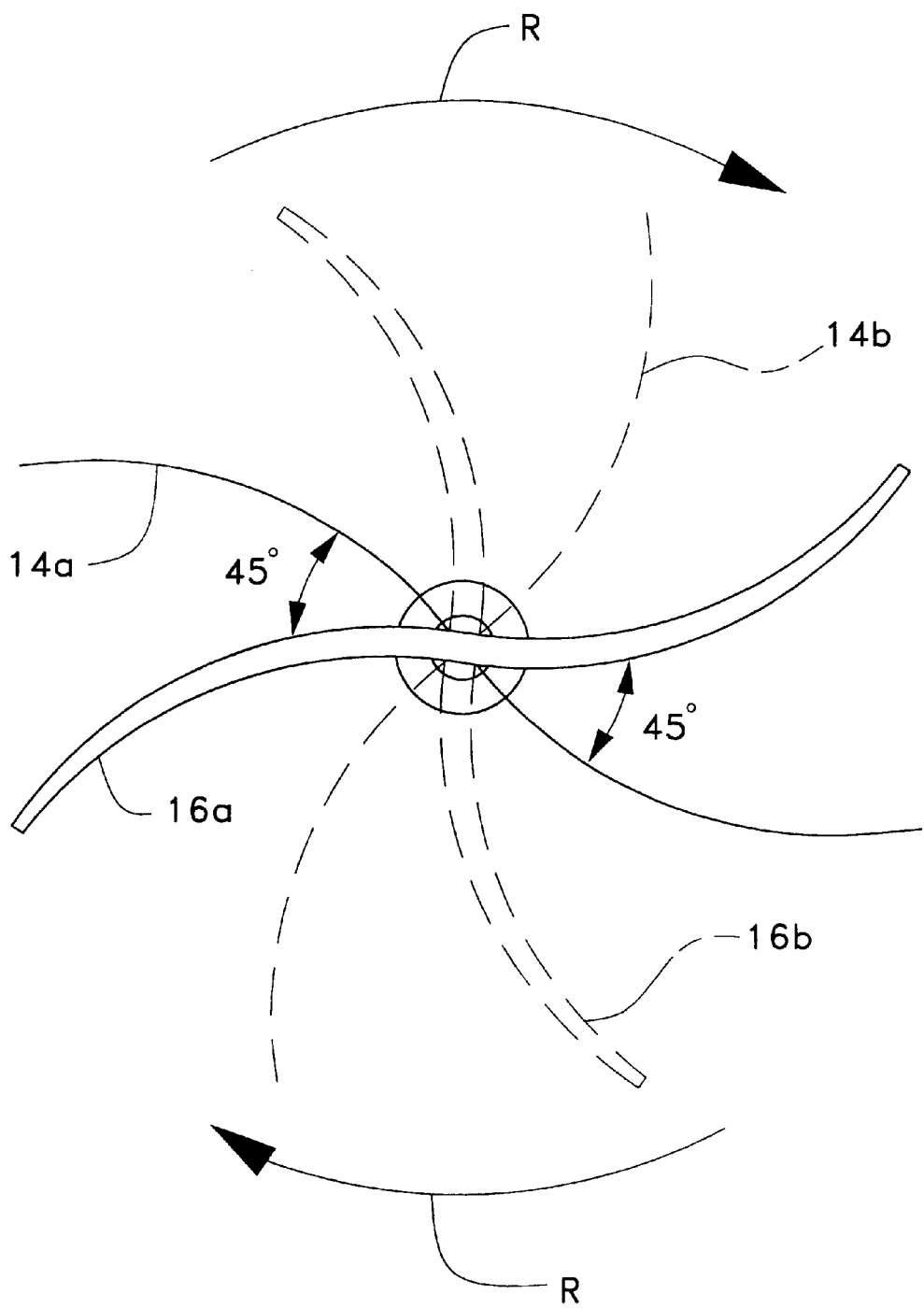
FIG. 4 is a schematic end elevation view of the rotary wing vanes, showing their angular offset from one another and rotational operation.

FIG. 4 illustrates the general chordwise shape of the two wing panels, as well as their angular offset from one another about their common lateral axis. The two wing panels are each shown in two different positions, in order to show their rotational movement as they are actuated by the wind. The first position for each panel is shown in solid lines, i.e., panel 14a and 16a, while the second position is illustrated by broken lines, i.e., panels 14b and 16b. The orientation of FIG. 4 is from the right side of the decoy, i.e., from the side having the second wing vane 16a, 16b extending therefrom. The first wing vane 14a, 14b is illustrated by a single line in FIG. 4, while the second wing vane 16a, 16b is illustrated as having a finite thickness with separate lines designating the opposite surfaces, in order to distinguish the two wing vanes 14a, 14b and 16a, 16b from one another in FIG. 4.

It will be seen that the two wing vanes have essentially identical airfoil shapes, i.e., each has a sinusoidal cross sectional shape extending along its chord from one edge to the other. This combination of concave and convex shape to each side of the central lateral axis of rotation defined by the wing spar rod 32, produces differential lifting forces upon each side of the wing vane from the lateral axis under most vane angles. However, as the vanes are symmetrical, there will be certain angles of attack at which the aerodynamic forces are balanced for each, thus canceling rotational forces for that particular wing vane.

To overcome this problem, the two wing vanes 14 and 16 are installed upon their common lateral spar rod 32 with some angular displacement about their common rotational axis. This is shown clearly in FIG. 4, with a forty five degree angle between the first positions 14a, 16a of the two vanes and thus also between their second positions 14b, 16b. Thus, if one of the vanes, e.g., the second vane as shown by its first position 16a, has balanced aerodynamic forces thereon with no resulting pitching moment about the rotational axis, the opposite vane, e.g., the first vane 14a, will be positioned to produce a net aerodynamic force and thereby produce rotation of the assembly. As the first vane 14a rotates to a position where the aerodynamic forces are neutralized, it will automatically rotate the joined second vane to some other angular position whereby aerodynamic forces will produce a pitching moment sand rotation of that vane. Continuous rotation of the wing vane assembly 14 and 16 is thus assured in any suitable breeze.

The relative angular position of the wing vanes 14 and 16 is fixed in the embodiment shown by the angle at which cotter pin 34 extends through spar rod 32 and tube 26 relative to the angle at which hitch pin 38 extends through spar rod 32 and tube 28. It will be obvious to those skilled in the art that other means for fixing the angular separation between vanes 14 and 16 may be used consistent with the teaching of the present invention, e.g., keying the spar rod 32.

The present wind activated decoy 10 is also provided with means to allow the decoy to pivot into the prevailing wind. The decoy 10 is mounted slightly above the underlying terrain or surface by means of a tubular pivot support 18, as noted further above. The silhouette body portion 12 of the decoy 10 includes an integral wind vane pivot support shaft 46 depending therebelow, which fits within the pivot support tube 18. Preferably, the pivot support shaft 46 has a diameter configured to fit smoothly within the interior of a conventional pipe or tube, e.g., a length of EMT (electrical metal tubing) or other suitable pipe or tube. Such materials are relatively inexpensive and provide sufficient strength and durability to support the present decoy 10.

Figure 5:
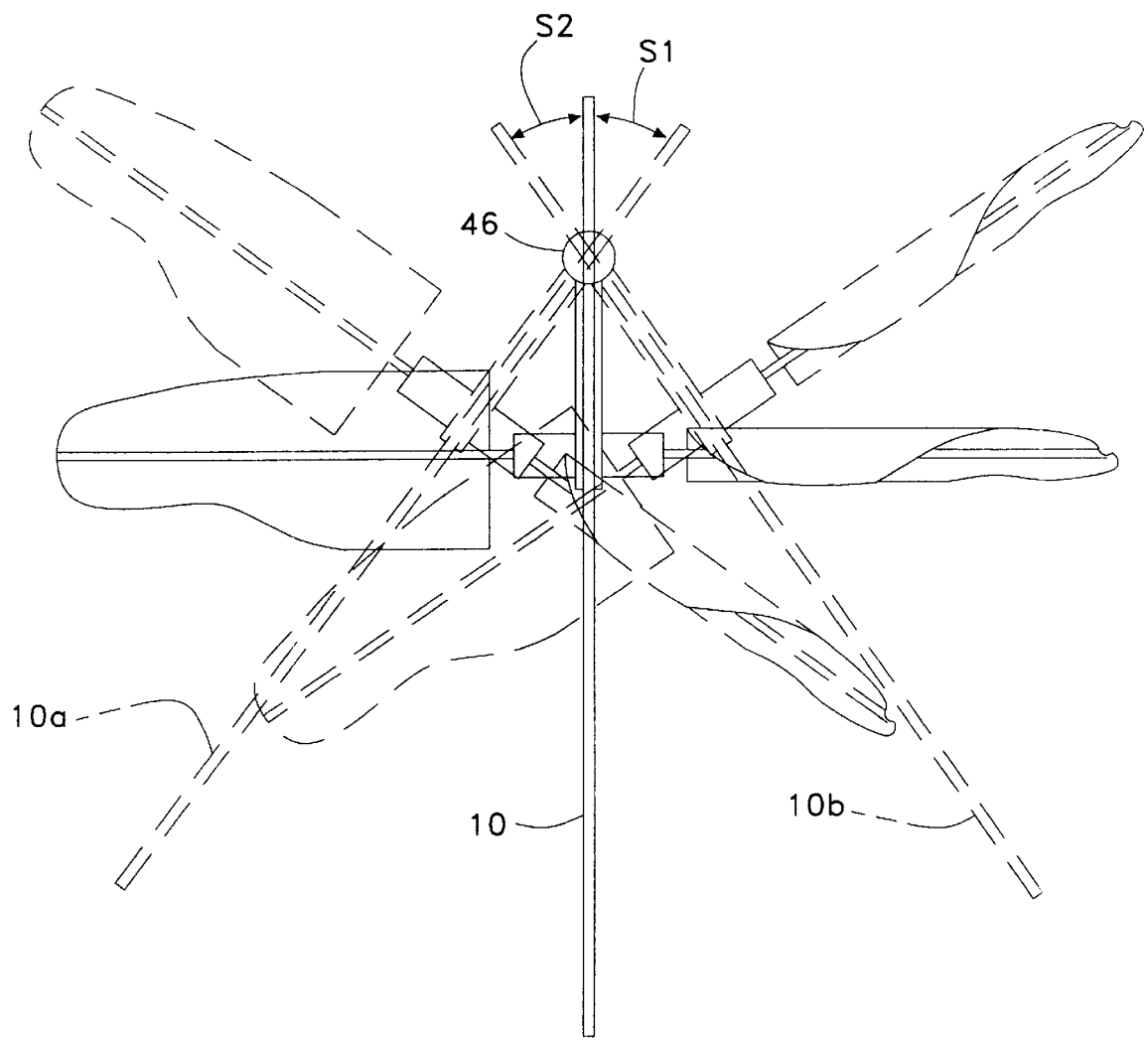
FIG. 5 is a schematic top plan view of the present decoy, showing the angular displacement of the decoy about its vertical axis as the decoy pivots to align itself with changes in wind direction.

The decoy 10 is used by driving the support tube 18 into the underlying surface, e.g., a pond bottom, etc., with the upper end positioned just above the surface, generally as shown in FIG. 1. The wing panels or vanes, 14, 16 are installed upon the body 12 as described further above, and the pivot support shaft 46 is placed into the open upper end of the support tube 18. As the pivot support shaft 46 is positioned ahead of the aerodynamic center of pressure of the decoy assembly 10, with the aerodynamic drag of the wing vanes 14 and 16 disposed aft of the pivot shaft 46, the decoy assembly 10 will always turn into the prevailing wind, since torque applied by the wind acts behind the pivot point. FIG. 5 illustrates this, with a central decoy position 10 shown in solid lines, a second position 10a turned clockwise to show the effects of a clockwise wind shift S1, and a third position 10b turned counterclockwise to show a counter-clockwise wind shift S2.

In conclusion, the present wind activated decoy provides reasonably realistic action while at the same time providing superior economy of purchase and operation over more complex mechanized decoys. The action of the rotating wing vanes provides an appearance which reasonably resembles the rapid flapping action of a game bird or waterfowl about to alight upon a surface (pond, etc.). This is particularly true when the opposite surfaces of the wing vanes of the present decoy are patterned or marked to represent the upper and lower wing surfaces of a bird, with their different colors and markings. Although the wing vanes of the present decoy rotate rather than flap, their appearance provides a reasonable resemblance to a rapid flapping action, particularly from some distance. The appearance of such an apparent rapid flapping action is indicative of birds alighting upon a surface, and can serve to entice other birds to land in the same area.

The provision of a forwardly mounted wind vane pivot shaft adds further realism, by allowing the decoy to pivot freely into the prevailing wind. This provides two benefits: (1) it assures that the wing vanes are aligned perpendicular to the wind direction for optimum efficiency, and (2) it serves to align the decoy into the wind to simulate the actions of a real game bird or waterfowl, which by their nature tend to align themselves with the prevailing wind. The realism of the present decoy, even with its economical profile construction, thus serves as an economical means of attracting game birds and waterfowl for hunters, photographers, and others having similar interests.

It is to be understood that the present invention is not limited to the embodiment described above, but encompasses any and all embodiments within the scope of the following claims.

We claim:

1. A wind activated decoy, comprising:
   a silhouette body portion comprising a thin, rigid sheet of material having an outline resembling that of a waterfowl;
   a lateral wing support structure tube disposed through said body portion;
   a first wing spar having a first wing vane permanently and immovably attached thereto; and
   a second wing spar having a second wing vane permanently and immovably attached thereto;
   wherein at least a portion of said first wing spar is disposed through said wing support structure tube and is freely rotatable in said wing support structure tube, said second wing spar being secured to said first spar in cantilever fashion on a side of said body portion opposite said first wing spar;
   wherein said first wing vane and said second wing vane each consist of a single thin, rigid sheet of material defining first and second wing vane chords respectively and extend horizontally outward from said body portion; and
   wherein said first wing vane and said second wing vane rotate in unison by action of wind only on said first and second wing vanes.

2. The wind activated decoy according to claim 1, wherein:
   said first wing spar comprises a first wing spar tube having a wing spar rod permanently and immovably affixed thereto and extending concentrically therefrom, the rod having a second wing spar tube attachment end; and
   said second wing spar comprises a second wing spar tube disposed concentrically over the second wing spar tube attachment end of the wing spar rod.

3. The wind activated decoy according to claim 2, wherein:
   said second wing spar tube is removably secured to said wing spar rod; and
   said wing spar rod is removably installed within said wing support structure tube, for disassembly of said first wing vane and said second wing vane from one another and from said body portion for compact storage.

4. The wind activated decoy according to claim 1, wherein:
   said first wing vane chord and said second wing vane chord define an angle therebetween when said second wing vane is secured to said first wing spar.

5. The wind activated decoy according to claim 1, wherein each said wing vane comprises a sinusoidal curve in cross section along said chord for producing aerodynamic rotation thereof when acted upon by the wind.

6. The wind activated decoy according to claim 1, further including ball bearings disposed within said wing support structure tube, for rotatably supporting said wing spar rod therein.

7. The wind activated decoy according to claim 1, further including:
   a wind vane pivot support shaft depending below said body portion, and formed integrally therewith; and
   a support tube, the pivot support shaft being removably and pivotally placed therein.

8. A wind activated decoy, comprising:
   a silhouette body portion comprising a thin, rigid sheet of material having an outline resembling that of a waterfowl;
   a wind vane pivot support shaft depending below said body portion, and formed integrally therewith;
   a lateral wing support structure tube disposed through said body portion;
   a first wing spar tube having a first wing vane permanently and immovably attached thereto;
   a second wing spar tube having a second wing vane permanently and immovably attached thereto; and
   a wing spar rod permanently and immovably affixed to said first wing spar tube, and extending concentrically therefrom, the rod having a second wing spar attachment end;

wherein at least a portion of said wing spar rod is disposed through said wing support structure tube and is freely rotatable in said wing support structure tube, said second wing spar tube being disposed concentrically over the second wing spar attachment end of said wing spar rod in cantilever fashion on a side of said body portion opposite said first wing spar tube; and wherein said wind vane pivot support shaft depends below said body portion at a point forward of an aerodynamic center of pressure defined by said body portion and said first and second wing vanes, so that the wind activated decoy always turns into the wind.

9. The wind activated decoy according to claim 8, wherein:

said first wing vane defines a first wing vane chord;

said second wing vane defines a second wing vane chord; and said first wing vane chord and said second wing vane chord define an angle therebetween when said second wing vane is disposed on said wing spar rod.

10. The wind activated decoy according to claim 8, wherein:

each said wing vane comprises a single thin, rigid sheet of material defining a chord; and each said wing vane comprises a sinusoidal curve in cross section along said chord for producing aerodynamic rotation thereof when acted upon by the wind.

11. The wind activated decoy according to claim 8, wherein:

said second wing spar tube is removably secured to said wing spar rod; and said wing spar rod is removably installed within said wing support structure tube, for disassembly of said first wing vane and said second wing vane from one another and from said body portion for compact storage.

12. The wind activated decoy according to claim 8, further including ball bearings disposed within said wing support structure tube, for rotatably supporting said wing spar rod therein.

13. The wind activated decoy according to claim 8, further including a support tube, the pivot support shaft being removably and pivotally placed therein.

* * * * *